| United States Patent [19] | [11] Patent Number: 4,669,686 |
|---|---|
| Huber et al. | [45] Date of Patent: Jun. 2, 1987 |

[54] BRAKING MECHANISM WITH DIFFERENT FORCES FOR OPPOSITE DIRECTIONS

[75] Inventors: Alois Huber, Vienna; Heinrich Hütter, Tulln, both of Austria

[73] Assignee: U.S. Philips Corporation, New York, N.Y.

[21] Appl. No.: 842,728

[22] Filed: Mar. 20, 1986

Related U.S. Application Data

[63] Continuation of Ser. No. 753,209, Jul. 9, 1985, abandoned.

[30] Foreign Application Priority Data

Jul. 13, 1984 [AT] Austria ................................. 2276/84

[51] Int. Cl.⁴ .................... B65H 59/38; F16D 63/00; G03B 1/04
[52] U.S. Cl. ...................................... 242/204; 188/80; 188/82.84; 242/75.4; 242/156.2
[58] Field of Search .................... 242/75.4, 202, 203, 242/204, 208, 156, 156.2; 188/80, 82.84

[56] References Cited

U.S. PATENT DOCUMENTS

| 362,328 | 5/1887 | Speidel | 188/82.84 X |
|---|---|---|---|
| 1,940,595 | 12/1933 | Johnson | 188/82.84 X |
| 2,209,695 | 7/1940 | Heinze | 188/82.84 X |
| 2,612,970 | 10/1952 | Discount | 188/82.84 |
| 2,868,470 | 1/1959 | Selsted | 242/204 |
| 2,962,237 | 11/1960 | Loewe | 242/204 X |
| 3,052,421 | 9/1962 | Fischer | 242/204 X |
| 3,638,881 | 2/1972 | Mirkovic | 192/135 X |
| 3,670,992 | 6/1972 | Goshima et al. | 242/204 |
| 3,937,422 | 2/1976 | Kato | 242/204 |

FOREIGN PATENT DOCUMENTS

| 1119539 | 7/1962 | Fed. Rep. of Germany . | |
|---|---|---|---|
| 900468 | 6/1945 | France | 188/82.84 |
| 4327768 | 3/1966 | Japan | 242/204 |
| 194796 | 3/1938 | Switzerland | 242/202 |
| 659811 | 4/1979 | U.S.S.R. | 188/82.84 |

*Primary Examiner*—John M. Jillions
*Assistant Examiner*—Joseph J. Hail, III
*Attorney, Agent, or Firm*—David R. Treacy

[57] ABSTRACT

A braking member, which is a roller, is pressed against a braked surface of an object by an element having a pressing surface which is elongated in the direction of relative movement and is parallel to the braked surface. Movement of the braking roller along the pressing surface is limited by two fixed stops which engage the roller braking surface. The braking force for each of the two directions of relative motion may be independently varied, for a fixed pressing force, by varying the inclination of the stop surface which is engaged by the roller surface.

20 Claims, 2 Drawing Figures

BRAKING MECHANISM WITH DIFFERENT FORCES FOR OPPOSITE DIRECTIONS

This is a continuation of application Ser. No. 753,209, filed July 9, 1985 now abandoned.

BACKGROUND OF THE INVENTION

This invention relates to a braking mechanism with direction-related braking force; and more particularly to such a mechanism having advantageous use for an object such as a winding device of a recording and/or reproducing apparatus for a record-carrier tape.

A braking member having a braking surface can be applied to the circumferential braked surface of a disc which is connected to the winding device. To obtain a braking force which differs depending on the direction of rotation of the disc, the braking member is freely movable through an angle corresponding to the two directions of rotation along an arcuate pressing surface which is concentric with the disc and which is situated on a pressing element such as a pivotally mounted braking lever. The two end positions of the braking member, in which the braking lever operates with different arm lengths, are each defined by a stop comprising a stop surface. Such a braking mechanism is disclosed in DE-OS 20 49 063 to which U.S. Pat. No. 3,638,881 corresponds.

In this known braking mechanism the braking member is a brake block, whose braking surface is concentric with the circumferential surface of the disc to be braked. The braking lever has a sector-shaped slot which is concentric with the disc and in which a pin on the brake block engages, so that the brake block is freely movable along the slot in conformity with the two directions of rotation, the two ends of the slot constituting stops which define the two end positions of the brake block. If the brake block is applied to the circumferential surface of the disc by a pivotal movement of the braking lever, it will move to one of the two end positions depending on the direction of rotation of the disc and brake the disc in this position. Depending on the end position of the brake block, the braking lever operates with different arm lengths, so that depending on its direction of rotation the disc is braked with a different braking force. This direction-related difference in force is required in recording and/or reproducing appratuses because during unwinding a winding device should be braked more strongly than during take up in order to ensure that in the stationary condition the record carrier between the two winding devices remains taut.

SUMMARY OF THE INVENTION

It is the object of the invention to improve the operation of a braking device of the type specified in the opening sentence.

In accordance with the invention the braking member is constructed as a braking roller, the stops are fixedly arranged on a frame or chassis of the apparatus, and in the two end positions the braking surface of the braking roller is positioned against the stop surface of the relevant stop. This cooperation of the braking roller with the relevant stationary stop ensures that the braking force is increased or decreased, as desired. Thus, the braking force, which determines the degree of braking, can be influenced simply; and to increase the braking force only a small force need be applied to the braking lever in order to ensure a correct braking of the winding device.

Another advantage of this construction of the apparatus is that the force exerted on the relevant stop by the braking roller during the braking operation is absorbed by the apparatus chassis and therefore does not react on the braking lever. In this respect it is to be noted that it is known to construct the braking member of a braking mechanism for a winding device as a braking roller, as is disclosed in, for example, DE-AS 11 19 539. However, in that known mechanism the braking roller is simply mounted for rotation on a braking lever and the braking action is obtained by directly braking the braking roller itself, for example by the braking friction or an additional brake, or by a wedging action obtained during braking. However, in a braking mechanism in accordance with the invention the braking forces are influenced by utilizing a braking roller which is freely movable along a braking lever and which cooperates with one of two stops arranged on the apparatus.

Generally, the stop surface of a stop is oriented transversely of the direction of movement of the element whose travel is to be limited, in order to ensure an exactly defined end position. In the present case the stop surface is oriented in such a way relative to the circumference of the disc to be braked that the tangential plane at the point of contact of the braking roller surface with the stop surface makes an angle of 90° with the tangential plane at the point of contact of the braking roller surface with the circumferential surface of the disc. For this orientation of the stop surfaces the braking force is increased by a factor whose magnitude depends on the coefficient of friction of the braking surface of the braking roller. It is found to be advantageous if for at least one stop the tangential plane at the point of contact of the braking roller surface with the stop surface makes an angle which differs from 90° with the tangential plane at the point of contact of the braking roller surface with the circumferential surface of the disc. This enables a force increasing/decreasing factor to be varied within wide limits. If this angle is larger than 90°, the multiplication factor for the braking force is smaller than that for an angle of 90° and may even become smaller than unity, which would mean a reduction in braking force. However, if the angle is made smaller than 90° the magnification factor is even larger than that obtained for an angle of 90°.

It is found to be advantageous if for the stop which defines that end position of the braking roller in which the braking lever operates with a longer arm, the tangential plane at the point of contact of the braking roller surface with the stop surface makes an obtuse angle with the tangential plane at the point of contact of the braking roller surface with the circumferential surface of the disc. This ensures that for the direction of rotation of the disc in which it should be braked less strongly the multiplication factor for the braking force is smaller in addition to the effect of the longer lever arm, so that braking proceeds even less strongly.

In this respect it is found to be effective if the obtuse angle is of the order of magnitude of 120°. Depending on the coefficient of friction of the braking surface of the braking roller this may yield a multiplication factor of the order of magnitude of unity, i.e. which may be slightly larger or smaller than unity. This means that the braking force is now increased hardly or only slightly, or is slightly reduced.

Further, it is found to be advantageous if for the stop which defines that end position of the braking roller in which the braking lever operates with a shorter arm, the tangential plane at the point of contact of the braking roller surface with the stop surface makes an acute angle with the tangential plane at the point of contact of the braking roller surface with the circumferential surface of the disc. In addition to the effect of the shorter braking lever arm this results in a multiplication factor for the braking force in that direction of rotation of the disc in which it is to be braked more strongly, so that the braking action becomes even stronger. Depending on the coefficient of friction of the braking surface of the braking roller, the multiplication factor increases very rapidly, as a result of the wedging action as the angle decreases.

Two embodiments of the invention will be described in more detail, by way of example, with reference to the accompanying drawings.

DESCRIPTION OF THE PREFERRED EMBODIMENTS

Figure 1:
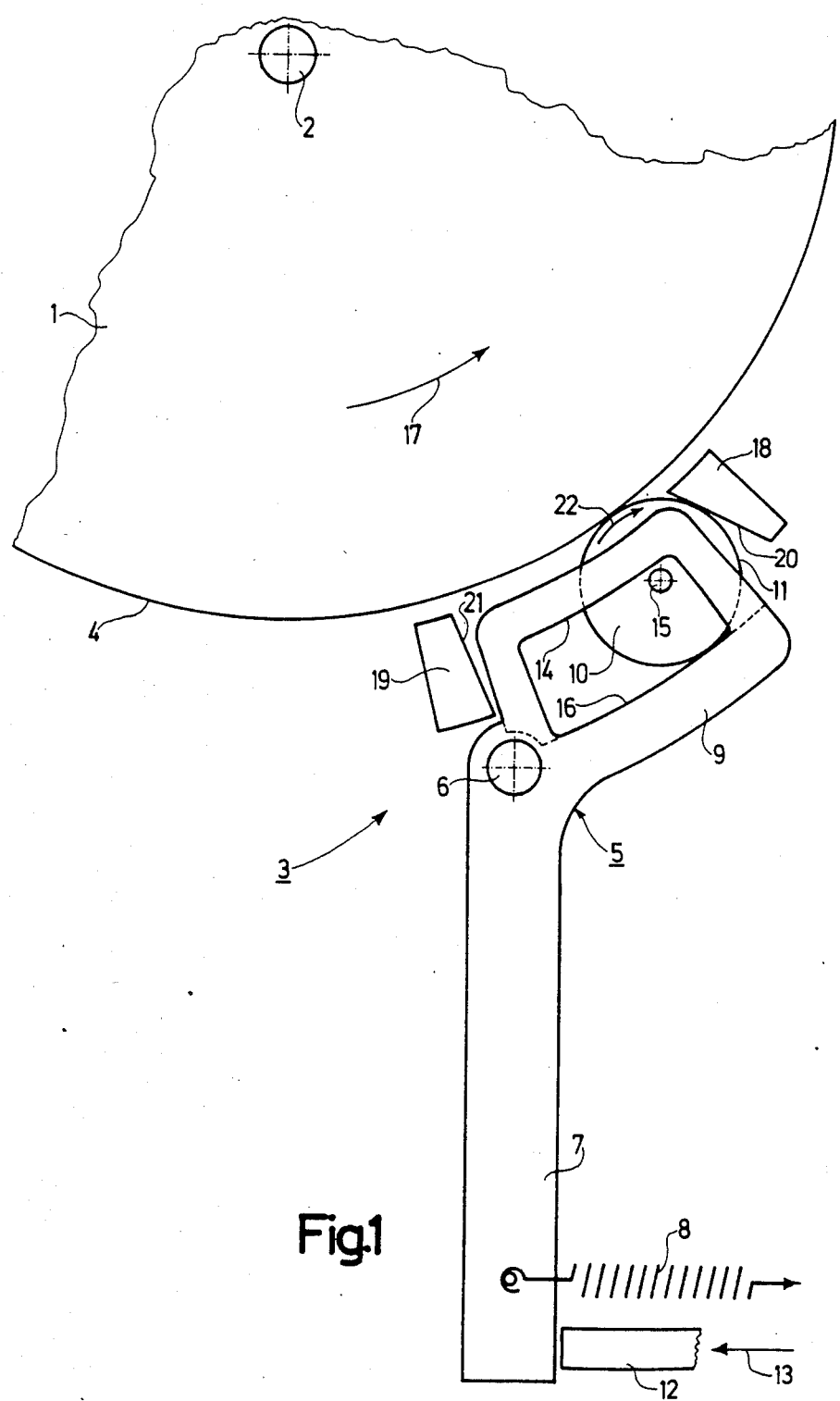
FIG. 1 is a diagrammatic view of a braking mechanism in which for the direction of rotation of the disc in which it should be braked less strongly the braking roller for this disc cooperates with a stop whose stop surface is oriented in such a way that the multiplication factor for the braking force is smaller than for the other direction of rotation of the disc.

FIG. 1 shows a disc 1 which is connected, in a manner not shown, to a winding device of a recording and-/or reproducing apparatus for a record-carrier tape, for example in that its spindle 2 carries a winding mandrel or a turntable. It is obvious that the disc may form an integral unit with a winding mandrel or a turntable. Such a winding device is stopped by means of a braking mechanism 3 which cooperates with the circumferential braked surface 4 of the disc 1. As is known, the winding device should be braked more strongly in the direction of rotation for unwinding than in the direction of rotation for take-up. The braking mechanism 3 comprises a pressing element or braking lever 5, which is pivotable about a spindle 6. A tension spring 8 acts on a lever arm 7 and thereby provides the required braking force. The other lever arm 9 carries a braking member in the form of a braking roller 10, whose circumferential surface constitutes the braking surface 11 which cooperates with the circumferential surface 4 of the disc 1. FIG. 1 shows the braking mechanism 3 in the actuated condition. For releasing the brake a rod 12 is pressed against the lever arm 7 in the direction indicated by the arrow 13, so that the braking lever 5 is pivoted clockwise and the braking roller 10 is lifted off the circumferential surface of the disc 1.

For mounting the brake roller 10 on the lever arm 9 this arm is given the shape of a U whose open side faces the disc 1, the braking roller 10 being situated between the two limbs of the U-shaped portion, which are ach formed with a recess 14, in which recesses journals 15 on both ends of the brake roller 10 engage. The surface of the web of the U-shaped portion which faces the disc is an arcuate surface 16 which is concentric with the disc 1, so that the braking surface 11 of the braking roller 10 can roll along this arcuate surface. In the operating condition of the braking mechanism 3 the braking roller 10 is urged against the circumferential surface 4 of the disc 1 by the arcuate surface 16 which acts as a pressing surface so that the journals 15 of the braking roller 10 are then clear of the edge portions bounding the recesses 14. The lengths of the recesses 14 and of the arcuate surface 16 are selected in such a way that the braking roller 10 can occupy two end positions relative to the spindle 6 of the braking lever 5 depending on the direction of rotation of the disc 1, in which positions the braking lever operates with lever arms of different length, resulting in different braking forces. When the braking roller 10 is in the downstream end position shown in FIG. 1, which it occupies in the direction of rotation of the disc 1 indicated by the arrow 17, the longer braking-lever arm is obtained and, consequently, the braking force is smaller. In the direction of rotation of the disc 1 opposite to that indicated by the arrow 17, the braking roller 10 first rolls along the arcuate surface 16 until it reaches the other end position, which is now the downstream end in which it is situated nearer the spindle 6 of the braking lever 5, so that the braking lever arm is then shorter and hence the braking force is stronger. Thus, the angle through which the braking roller 10 is movable between its two end positions determines the ratio between the longer and the shorter braking-lever arm, so that the braking lever 5 produces different braking forces for the two directions of rotation of the disc 1.

These two end positions of the braking roller 10 are defined by means of two stops 18 and 19 on the apparatus, which stops each have respective stop surfaces 20 and 21 against which the braking roller 10 abuts with its braking surface 11. Thus, in these end positions the braking surface 11 of the braking roller 10 cooperates with the arcuate surface 16 on the braking lever arm 9, the downstream one of the two stop surfaces 20 or 21 of the relevant stops 18 and 19, and the circumferential surface 4 of the disc 1.

During braking the circumferential surface 4 of the disc 1 exerts a tangential force on the braking roller 10 at the point of contact with the braking surface 11 of the braking roller 10, which force in the direction of rotation of the disc 1 indicated by the arrow 17 tends to rotate the braking roller 10 in the direction indicated by the arrow 22, and to urge the braking surface 11 of the braking roller 10 against the stop surface 20 of the stop 18. In this way a frictional force is built up between the braking surface 11 of the braking roller 10 and the stop surface 20 of the stop 18, which force is directed towards the disc 1 and thus assists the braking force provided by the braking lever 5, so that a stronger braking action is obtained. Since the force exerted on the relevant stop 18 or 19 by the braking roller 10 during braking is absorbed by the apparatus chassis, this also ensures that there is no reaction on the braking lever 5.

The additional braking force results in a multiplication factor for the braking force produced by the braking lever. This factor depends on the coefficient friction of the braking surface 11 of the braking roller 10 and on the orientation of the stop surfaces 20 and 21 of the stops 18 and 19; that is on the angle which the tangential plane at the point of contact of the braking roller surface 11 with the stop surface makes with the tangential plane at the point of contact of the braking roller surface with the circumferential surface of the disc. If the angle between these tangential planes is 90°, as in the case of the stop 19, and if the friction coefficient is 0.7, as obtained with various kinds of synthetic materials a multiplication factor of approximately 3 is obtained. This means that for the direction of rotation of the disc 1 which is opposite to that indicated by the arrow 17, when the braking roller 10 is in its other end position and cooperates with the stop surface 21 of the stop 19, the braking force is tripled in comparison with that provided by the shorter braking lever arm. This factor increases as the coefficient of friction increases.

If these tangential planes make an obtuse angle with each other, as is the case with the stop 18, the multiplication factor for the braking force is smaller because it is now assisted by only a fraction of the resulting frictional force. Moreover, as the braking roller 10 tends to rotate the direction indicated by the arrow 22, the effect is obtained that the braking roller 10 tends to move away from the disc 1 towards the stop surface 20, which corresponds to a reduction in braking force, which effect increases as the obtuse angle between the two tangential planes becomes larger. In this way the multiplication factor may become even smaller than unity; that is, the braking force is reduced, which may be desirable because the disc 1 should be braked less strongly in the direction of rotation indicated by the arrow 17. For example, if said angle is 120° and the coefficient of friction is 0.7, a multiplication factor of approximately unity is obtained, so that only the braking force produced by the longer braking lever arm of the braking lever 5 obtains, as in the present example. However, if the angle between the two tangential planes is acute, the multiplication factor for the braking force is increased even further in comparison with the 90° position of the two tangential planes, because of the wedging action which gives rise to an increased friction at the stop surface thus oriented. For angles which are smaller than 90°, this wedging action results in a very rapid increase of this multiplication factor, even to such an extent that the brake is blocked. It is obvious that such blocking should be avoided, because this may give rise to a substantial local wear of the braking roller. As can be seen, the steps in accordance with the invention enable the braking properties of such a braking mechanism to be influenced and influenced to a considerable extent. In order to increase these possibilities even further, the stops may be rendered adjustable with respect to the inclination of their stop surfaces.

It is to be noted that in the present embodiment a frictional force is built up or the brake roller 10 exerts a force on the lever arm 9 at the point of contact of the braking surface 11 of the braking roller 10 with the arcuate surface 16 of the lever arm. This frictional force is directed in such a way that it assists in pressing the braking roller 10 against the stop surfaces 20 and 21 of the relevant stops 18 and 19 and thereby leads to an increase in braking force. With respect to the force exerted on the lever arm 9 by the braking roller 10 it is to be noted that for both end positions of the braking roller 10 the location of the arcuate surface 16 of the lever arm 9 relative to the spindle 6 of the braking lever 5 is selected in such a way that the direction of this force extends substantially through the spindle 6, so that there is hardly any reaction on the braking lever 5.

Figure 2:
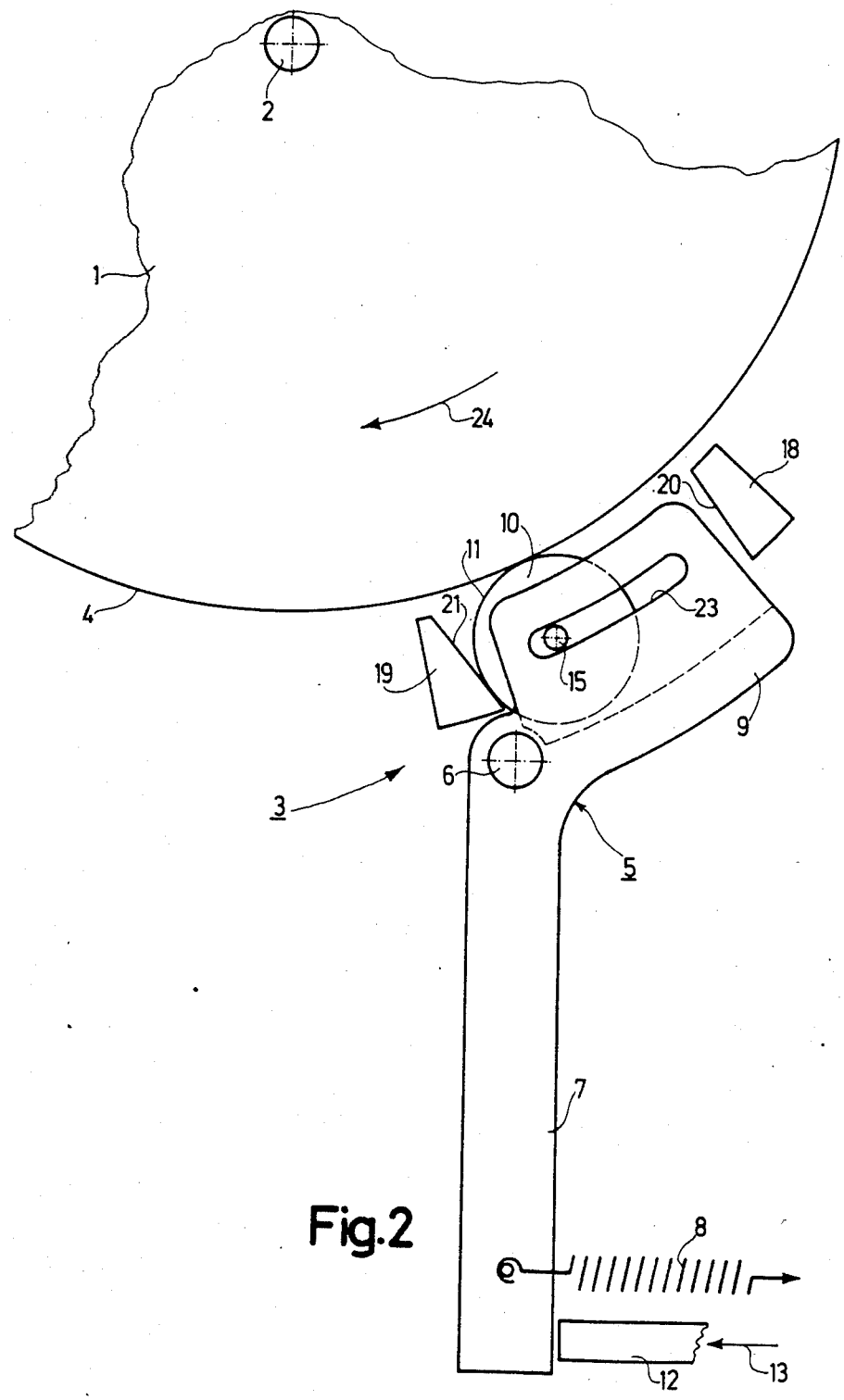
FIG. 2 shows a braking mechanism in which for the direction of rotation of the disc in which it should be braked more strongly the braking roller for this disc cooperates with a stop whose stop surface is oriented in such a way that the multiplication factor for the braking force is comparatively large.

In a second embodiment shown in FIG. 2, the journals 15 of the brake roller 10 are guided directly in slots 23 which are formed in the two limbs of the U-shaped lever arm 9. These slots 23 are concentric with disc 1, so that they constitute arcuate surfaces along which the journals 15 can move freely when the braking roller 10 is applied to the circumferential surface 4 of the disc 1, so that the braking roller 10 can again occupy two end positions depending on the direction of rotation of the disc 1, in which positions its braking surface 11 abuts against the stop surface 20 or 21 of the relevant stop 18 or 19 and cooperates with this surface. In the second embodiment the braking force is transmitted from the braking lever 5 to the braking roller 10 by the cooperation of the slots 23 with the journals 15 of the braking roller 10. The journals 15 are clear of the ends of the slots 23 in the two end positions of the braking roller 10, in which again different lengths of the braking lever arm are obtained, so that these end positions are defined only by the stops 18 and 19. FIG. 2 shows the position of the braking roller 10 when the disc 1 rotates in the direction indicated by the arrow 24, in which direction it should be braked more strongly and the braking lever operates with the shorter lever arm, so that a larger braking force is obtained.

In the second embodiment the stop surface 21 of the stop 19 is oriented in such a way that the angle between the tangential plane at the point of contact of the braking roller surface 11 with the stop surface 21 and the tangential plane at the point of contact of the braking roller surface 11 with the circumferential surface 4 of the disc is acute, in the present case 75°. As already stated, this results in a multiplication factor for the braking force which is larger than in the case that the stop surfaces are oriented in such a way that the angle between said tangential planes is 90°. If the coefficient of friction is 0.7, this yields a multiplication factor of approximately 11 and hence a comparatively large increase in braking force.

In the present example the stop surface 20 of the stop 18, which is operative when the disc rotates in a direction opposite to that indicated by the arrow 24, is so oriented that the angle between said tangential planes is 90°, so that for this direction of rotation of the disc 1 the braking force is also increased, that is, it is approximately tripled. As in the present embodiment the braking force is increased in both directions of rotation of the disc 3, the braking force to be produced by the braking lever 5 may be comparatively small.

As will be apparent from the foregoing, several modifications of the embodiments described above are possible without departing from the scope of the present invention. This applies in particular to the choice of the orientation of the stop surfaces of the two steps and the selected coefficience of friction of the braking surface of the braking roller, so that the multiplication factor for the braking force for both directions of rotation of the disc can be selected in a simple way in conformity with the requirements. It is obvious that such a braking mechanism may be provided for both winding devices of a recording and/or reproducing apparatus.

What is claimed is:

1. A braking mechanism for a winding device of a recording and/or reproducing apparatus for a record-carrier tape, in which a braking member having a braking surface can be applied to the circumferential surface of a disc which is connected to the winding device and, in order to obtain a braking force which differs depending on the direction of rotation of the disc, said braking member is freely movable through an angle corresponding to the two directions of rotation along an arcuate surface which is concentric with the disc and which is situated on a pivotally mounted braking lever, the two end positions of the brake member, in which the braking lever operates with different arm lengths, each being defined by a stop comprising a stop surface, characterized in that the braking member is constructed as a braking roller, the stops are fixedly arranged on the apparatus, and in the two end positions the braking surface of the braking roller is positioned against the stop surface of the relevant stop.

2. A braking mechanism as claimed in claim 1, characterized in that for at least one stop the tangential plane at the point of contact of the braking roller surface with the stop surface makes an angle which differs from 90° with the tangential plane at the point of contact of the braking roller surface with the circumferential surface of the disc.

3. A braking mechanism as claimed in claim 2, characterized in that for the stop which defines that end position of the braking roller in which the braking lever operates with a longer arm, the tangential plane at the point of contact of the braking roller surface with the stop surface makes an obtuse angle with the tangential plane at the point of contact of the braking roller surface with the circumferential surface of the disc.

4. A braking mechanism as claimed in claim 3, characterized in that the obtuse angle is of the order of magnitude of 120°.

5. A braking device as claimed in claim 2, characterized in that for the stop which defines the end position of the braking roller in which the braking lever operates with a shorter arm the tangential plane at the point of contact of the braking roller surface with the stop surface makes an acute angle with the tangential plane at the point of contact of the braking roller surface with the circumferential surface of the disc.

6. A braking mechanism for affecting one of two opposite directions of relative motion between first and second objects, said first object having a braked surface tangential to the direction of relative motion,
  said mechanism being coupled to said second object for relative movement, along with said second object, with respect to said first object, and comprising a braking member having a braking surface and means for pressing said braking surface against said braked surface,
  characterized in that said braking member is a circular cylindrical roller having an axis, the cylindrical surface of said roller being said braking surface,
  said means for pressing comprises a pressing element having a pressing surface parallel to said braked surface, and means for urging said pressing element toward said braked surface,
  said mechanism further comprises a first stop mounted to said second object independently of said means for pressing and having a roller-engaging surface facing said roller, said roller-engaging surface arranged to engage said roller when the stop is in the downstream position with respect to said one direction of relative motion,
  said pressing surface engages said roller so as to press the roller against the braked surface with the roller axis transverse to said direction of relative motion, said pressing surface extending in said direction of relative motion so as to permit said roller to move along said braked surface in said one direction of relative motion into engagement with said stop.

7. A mechanism as claimed in claim 6, characterized in that said pressing surface engages the braking surface of said roller.

8. A mechanism as claimed in claim 6, characterized in that said roller comprises a respective coaxial circular projection at each end of the roller, said projections each having a diameter substantially less than the diameter of said braking surface, and said pressing surface engages said projections.

9. A mechanism as claimed in claim 6, characterized in that said second object comprises a frame, and said pressing element is a lever arranged on said frame to be pivotable about an axis perpendicular to said direction of relative motion, braking force being controllable by varying a torque by which the lever is pivotally urged in a direction which presses the roller against the braked surface.

10. A mechanism as claimed in claim 6, characterized in that said first stop is inclined at an angle with respect to said braked surface such that the braking force is greater than that provided when the stop is locally perpendicular to the braked surface.

11. A mechanism as claimed in claim 6, for affecting each of two opposite directions of relative motion,
  comprising a second stop mounted to said second object independently of said means for pressing and having a roller-engaging surface facing said first stop, arranged for engaging said roller during relative motion in a direction opposite said one direction,
  said pressing surface extending in said directions of relative motion so as to permit said roller to move along said braked surface in said directions of relative motion between said stops, and
  each stop being oriented at an angle with respect to said braked surface such that the braking forces exerted by the roller against said braked surface for the respective directions of relative motion have a predetermined ratio.

12. A mechanism as claimed in claim 11, characterized in that said second object comprises a frame, and said pressing element is a lever arranged on said frame to be pivotable about an axis perpendicular to said direction of relative motion, braking force being controllable by varying a torque by which the lever is pivotally urged in a direction which presses the roller against the braked surface.

13. A mechanism as claimed in claim 12, characterized in that said first stop is inclined at an angle with respect to said braked surface such that the braking force is less than that provided when the stop is locally perpendicular to the braked surface.

14. A mechanism as claimed in claim 13, characterized in that said pressing surface engages the braking surface of said roller.

15. A braking mechanism for affecting each of two opposite directions of rotation of an object which is rotatable about an axis, comprising a disc connected to said object for rotation therewith about a first axis, said disc having a circular cylindrical braked surface
  said mechanism comprising a braking surface and means for pressing said braking surface against said braked surface, said mechanism being coupled to a frame which is fixed with respect to said first axis,
  characterized in that said braking member is a circular cylindrical roller having a second axis, the cylindrical surface of said roller being said braking surface, said means for pressing comprises a pressing element having a circular cylindrical pressing surface coaxial with said braked surface, and means for urging said pressing element toward said braked surface, said mechanism further comprises first and second stops each having a respective roller-engaging surface facing the other stop, the respective roller-engaging surface engaging said roller when the respective stop is in the downstream position with respect to the direction of relative motion, said pressing surface engages said roller so as to press the roller against the braked surface with the roller axis transverse said directions of relative motion, said pressing surfaces extending in said directions of relative motion so as to permit said roller to move along said braked surface in the directions of relative motion between said stops, and each stop is oriented at an angle with respect to a radial plane in which said first axis lies such that the braking forces exerted by the roller against said braked surface for the respective directions of relative motion have a predetermined ratio.

16. A mechanism as claimed in claim 15, characterized in that said first stop is inclined at an angle with respect to said braked surface such that the braking force is less than that provided when the stop is locally perpendicular to the braked surface.

17. A mechanism as claimed in claim 16, characterized in that said pressing surface engages the braking surface of said roller.

18. A mechanism as claimed in claim 17, characterized in that said pressing element is a lever arranged on said frame to be pivotable about an axis perpendicular to said direction of relative motion, braking force being controllable by varying a torque by which the lever is pivotally urged in a direction which presses the roller against the braked surface.

19. A mechanism as claimed in claim 15, characterized in that said pressing surface engages the braking surface of said roller.

20. A mechanism as claimed in claim 15, characterized in that said roller comprises a respective coaxial circular projection at each end of the roller, said projections each having a diameter substantially less than the diameter of said braking surface, and said pressing surface engages said projections.

* * * * *